(12) United States Patent
Klatt et al.

(10) Patent No.: US 7,493,895 B2
(45) Date of Patent: Feb. 24, 2009

(54) SYSTEM FOR THE METERED FEEDING OF VOLATILE FUEL COMPONENTS

(75) Inventors: Christopher Klatt, Heidelberg (DE); Torsten Gerlich, Bensheim (DE); Christof Klesen, Modautal (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 10/793,400

(22) Filed: Mar. 4, 2004

(65) Prior Publication Data

US 2004/0231646 A1 Nov. 25, 2004

(30) Foreign Application Priority Data

Mar. 6, 2003 (DE) ................. 103 10 109

(51) Int. Cl.
  *F02M 33/04* (2006.01)
  *F02M 25/08* (2006.01)
  *F02D 45/00* (2006.01)
(52) U.S. Cl. ....................... 123/520; 137/554
(58) Field of Classification Search ................. 123/458, 123/494, 519, 520, 521, 518, 516; 137/554; 73/119 A
See application file for complete search history.

(56) References Cited

U.S. PATENT DOCUMENTS

| 4,715,331 | A | * | 12/1987 | Kreuter | 123/90.11 |
|---|---|---|---|---|---|
| 4,809,742 | A | * | 3/1989 | Grau | 137/554 |
| 5,283,495 | A | | 2/1994 | Wendel et al. | 310/257 |
| 5,329,909 | A | | 7/1994 | Hosoda et al. | 123/520 |
| 5,373,822 | A | * | 12/1994 | Thompson | 123/520 |
| 5,413,082 | A | * | 5/1995 | Cook et al. | 123/520 |
| 5,482,023 | A | | 1/1996 | Hunt et al. | 123/491 |
| 5,551,406 | A | | 9/1996 | Everingham et al. | 123/520 |
| 5,609,135 | A | | 3/1997 | Ogawa | |
| 5,669,413 | A | * | 9/1997 | Hegglin et al. | 137/554 |
| 5,791,318 | A | * | 8/1998 | Schulz et al. | 123/520 |
| 5,803,056 | A | * | 9/1998 | Cook et al. | 123/520 |
| 5,994,788 | A | * | 11/1999 | Dobler et al. | 307/10.1 |
| 6,050,245 | A | * | 4/2000 | Cook et al. | 123/520 |
| 6,152,115 | A | * | 11/2000 | Busato et al. | 123/520 |
| 6,205,982 | B1 | * | 3/2001 | Blomquist et al. | 123/520 |

(Continued)

FOREIGN PATENT DOCUMENTS

DE 40 38 761 6/1992

(Continued)

*Primary Examiner*—Stephen K Cronin
*Assistant Examiner*—Arnold Castro
(74) *Attorney, Agent, or Firm*—Harness, Dickey & Pierce, P.L.C.

(57) ABSTRACT

A system for the metered feeding of volatile fuel components, in particular into the intake manifold of an internal combustion engine of a motor vehicle, includes an electromagnetic canister-purge valve which is actuatable in proportional pulse-width modulation, and a closed-loop control circuit with which, for the purpose of compensating for external interferences, the coil current of the canister-purge valve is adjustable. The system is characterized in that at least one device provided for detecting a variable parameter that includes at least one of a mass flow through the valve, a volume flow through the valve, a distance between the valve seat and the sealing element of the valve, and a $CH_x$ portion in the volume flow. The coil current is adjustable as a function of the parameter.

6 Claims, 1 Drawing Sheet

U.S. PATENT DOCUMENTS 6,276,193 B1 * 8/2001 Benjey .................... 73/40.5 R
6,523,532 B1 2/2003 Esteghlal et al. ............ 123/698
6,845,755 B2 * 1/2005 Cook et al. ................. 123/458

FOREIGN PATENT DOCUMENTS

| | | |
|---|---|---|
| DE | 19540021 | 4/1997 |
| DE | 199 36 166 | 2/2001 |
| EP | 1 077 313 | 2/2001 |
| WO | 9906893 | 2/1997 |

* cited by examiner

SYSTEM FOR THE METERED FEEDING OF VOLATILE FUEL COMPONENTS

Priority is claimed to German Patent Application No. DE 103 10 109.8-13, filed on Mar. 6, 2003, the entire disclosure of which is incorporated by reference herein.

BACKGROUND

The present invention relates to a system for the metered feeding of volatile fuel components, in particular into the intake manifold of an internal combustion engine of a motor vehicle. The system includes an electromagnetic canister purge valve which is actuatable in proportional pulse-width modulation, and a closed-loop control circuit with which, for the purpose of compensating for external interferences, the coil current of the canister-purge valve is adjustable.

To collect the volatile fuel vapors contained in the fuel tank of a motor vehicle, to store them, and to finally feed them in a metered manner into the intake manifold of the internal combustion engine of the motor vehicle is known. As a rule, an activated carbon canister is used for collecting and storing the fuel vapors. Activated carbon binds (absorbs) the fuel vapor and, at appropriate ventilation, releases it again. Thus, fresh air, sucked through the activated carbon canister by the engine during driving operation, takes up the fuel and feeds it to the engine. Metered addition of the air/fuel mixture takes place via a canister-purge valve. A canister-purge valve is typically an electromagnetic valve including a solenoid, an armature having a sealing element, a sealing seat, as well as a restoring spring (closing spring). In the energized state, using the magnetic force of the coil, the solenoid lifts the sealing element from the sealing seat against the spring resistance of the closing spring, thereby unblocking the flow-through opening. The valve is in its open position. In the de-energized state, the sealing element is pressed onto the sealing seat by the closing spring and the valve is in its closed position.

Actuation of the canister-purge valve takes place via the engine control unit which, corresponding to the current load state of the internal combustion engine, determines the maximum meterable air/fuel mass flow and converts it into a corresponding control signal. As a rule, the canister-purge valve is actuated in a clocked manner (pulse-width modulation) and, as a function of the predetermined pulse-duty factor specified in each case by the engine control unit, releases different metered quantities. Pulse-duty factor is understood in this connection as the ratio between the period of the open valve and the total period, i.e., the period of the open and closed valve.

In order to avoid the oscillating movement of the armature including the sealing element between the open and closed position, which involves various disadvantages, it is also known, from WO 99/06893, for example, the entire disclosure of which is incorporated by reference herein, to operate the clocked canister-purge valve in what is known as proportional operation. Here, the clock frequency is to be selected at such a high level that the valve can no longer follow the oscillating excitation and remains instead in a position which corresponds to the average coil current.

Due to manufacturing tolerances, aging, fluctuations in the vehicle electrical system, and temperature, e.g., through self-heating of the coil, purely controlled canister-purge valves have a relatively large tolerance range in their characteristic curve (mass flow as a function of the actuation time). This results in the fact that, in order to be able to reliably prevent too high a mass flow through the canister-purge valve, the possible purge performance cannot be fully utilized. On the other hand, tightening of the exhaust gas emission regulation is imminent, which makes an increase in the purge performance absolutely necessary. However, an increase in the purge performance is very hard to achieve and involves a highly complex application, i.e., very complex treatment algorithms are devised in order to obtain maximum purge performance.

In order to compensate for interfering influences on the valve's metering accuracy caused by fluctuations in the vehicle electrical system or temperature fluctuations, WO 99/06893 A1 describes a very complex closed-loop control circuit in which the instantaneous coil current is determined, digitized, and supplied to a microprocessor situated in the engine control unit. In a complicated algorithm composed of this signal and additional input variables, this microprocessor ultimately determines the control signal for the coil current.

SUMMARY OF THE INVENTION

An object of the present invention is to refine a system of the type initially mentioned in such a way that the metering accuracy and thus the purge performance is increased.

The present invention provides a system for the metered feeding of volatile fuel components, in particular into the intake manifold of an internal combustion engine of a motor vehicle including an electromagnetic canister-purge valve which is actuatable in proportional pulse-width modulation, and a closed-loop control circuit with which, for the purpose of compensating for external interferences, the coil current of the canister-purge valve is adjustable, wherein devices are provided for detecting the mass flow and/or volume flow through the valve and/or the distance between the valve seat and the sealing element of the valve and/or the $CH_x$ portion in the volume flow; and the coil current is adjustable as a function of at least one of the variable parameters mentioned.

Advantageous embodiments of the present invention are described in the claims.

According to the present invention, devices for detecting the mass flow and/or volume flow through the valve and/or the distance between the valve seat and the sealing element of the valve and/or the $CH_x$ portion in the volume flow, the coil current being adjustable as a function of at least one of the variable parameters mentioned, are provided in a system for the metered feeding of volatile fuel components, in particular into the intake manifold of an internal combustion engine of a motor vehicle including an electromagnetic canister-purge valve which is actuatable in proportional pulse-width modulation, and a closed-loop control circuit with which, for the purpose of compensating for external interferences, the coil current of the canister-purge valve is adjustable.

The present invention has an advantage that not only interfering influences due to fluctuations in the vehicle electrical system or temperature may be reliably eliminated, but rather other secondary interfering influences such as tolerances in the coil and the magnetic circuit, friction, set behavior of the sealing element, attrition of the seal, swelling, adherence of the sealing element on the sealing seat, etc. are reliably eliminated in principle via direct measurement of either the mass flow or the $CH_x$ portion in the volume flow itself, or the dimension of the opening gap.

Sensors for detecting a mass flow or $CH_x$ portions in the volume flow are known and are described in the literature. However, in a preferred embodiment of the present invention, the gap size, i.e. the distance between the valve seat and the sealing element, is used as a measure of the flow rate, since this is simpler to implement from the manufacturing point of view.

In this preferred embodiment, a system according to the present invention has devices for detecting the distance between the sealing element and the valve seat. These devices may be based on the utilization of electrical, optical, and/or magnetic effects. All systems according to the present invention have in common that a physical field is created, an electrical field or a magnetic field, or even a "light field," for example, and that assigned sensor devices (e.g., a capacitive or inductive sensor, a Hall sensor, or an optical sensor) are provided for detecting time and/or local changes in these fields. These time and/or local changes are caused by the position change of the sealing element in such a way that the device creating the field and the assigned sensor are moved relative to one another as a function of this position change. The device creating the field is advantageously fixedly attached to the sealing element and follows its position change, while the sensor device is fixed to the valve housing.

In a particularly preferred embodiment of the present invention, the devices for detecting the gap size include a magnetically soft element as well as a sensor element including at least one electric conductor loop, the devices being situated in such a way that, as a function of a position change of the sealing element relative to the sealing seat, the magnetic flux through the at least one conductor loop, generated by the magnetically soft element, changes, thereby creating a measured variable parameter which is convertible into an electric control signal.

Preferably, the magnetic element is fixedly attached to the sealing element and the sensor element is fixed to the valve housing.

In a further preferred embodiment of the present invention, the permanent-magnetic element is situated at the end of a plunger opposite the sealing element, the plunger being fixedly attached to the sealing element. The entire plunger may be made of a permanent-magnetic material. In the embodiments described above, a Hall sensor 9, a field plate, and a magnetoresistive sensor 11 as a sensor element are advantageously used.

Likewise, a plunger may be provided which is made, at least at the appropriate end, of ferromagnetic material, plastic-bonded ferrites, for example; however, inductive sensors such as an air-core inductor 15 are to be used for detecting field changes.

In a further preferred embodiment of the present invention, the devices for detecting the distance include a device which generates an optical signal as well as an optical sensor; means being provided which cause the optical signal to change as a function of a position change of the sealing element relative to the sealing seat, whereby a measured variable parameter is created which is convertible into an electric control signal. These means preferably include an optically reflecting surface, on which the optical signal is reflectable and which is fixedly attached to the sealing element. To simplify matters, the above-mentioned plunger is also used in this variant.

In a further preferred embodiment of the present invention, the sealing element is, as described above, fixedly attached to a plunger which, at least at its end opposite the sealing element, is made of a light-attenuating material and which is immersible with this end into a light barrier formed by a light source and the optical sensor element as a function of a position change of the sealing element.

Photodiodes and/or phototransistors may be used as optical sensors in the above-described variants.

The optical methods described have the advantage over the methods based on electric or electromagnetic effects in that they are very cost-effective. A disadvantage is the fact that they may be used at ambient temperatures of up to 85° C. and that there is a danger of interferences due to contamination.

Methods using a Hall sensor as the sensor element are to be preferred among the "electromagnetic methods"; though they happen to be the most expensive systems, they are also the most stable systems.

A possibility for regulating the distance between the sealing element and the sealing seat using a system according to the present invention is described in the following on the basis of an example: The engine control unit releases a setpoint request for the mass flow. From this, the valve control unit computes the corresponding value for the sealing gap (e.g. from a table). This gap serves as the gap setpoint stipulation of the position control loop and is compared with a value detected by one of the measuring sensors described above. This comparison value is supplied to a controller which may be implemented as a PID structure. The controller output controls a power output element in such a way that a current flows in the coil of the electromagnetic actuator, the current, via the action of the electromagnetic force, in turn generating a force which acts against an integrated spring, thereby moving the sealing element connected to the armature into the required setpoint gap position.

In order to compensate for aging processes, for example, the present invention allows for an additional function, for example, in which the position at which the gap just now opens is found automatically. This position corresponds, for example to a value of 0 in the exemplary table. For this, the valve is de-energized and the sensor value is detected. The valve is then re-energized and the sensor value is detected again. This value represents the maximum travel. Thus, the present invention allows for a control algorithm at which zeroing, i.e., the calibration with the valve closed and fully open (i.e., tare function), may take place dynamically during the service life of the valve.

In addition, characteristic correction is possible during production.

BRIEF DESCRIPTION OF THE DRAWINGS

The present invention is explained in greater detail below, with reference to the drawings, in which.

DETAILED DESCRIPTION

Figures 1, 2:
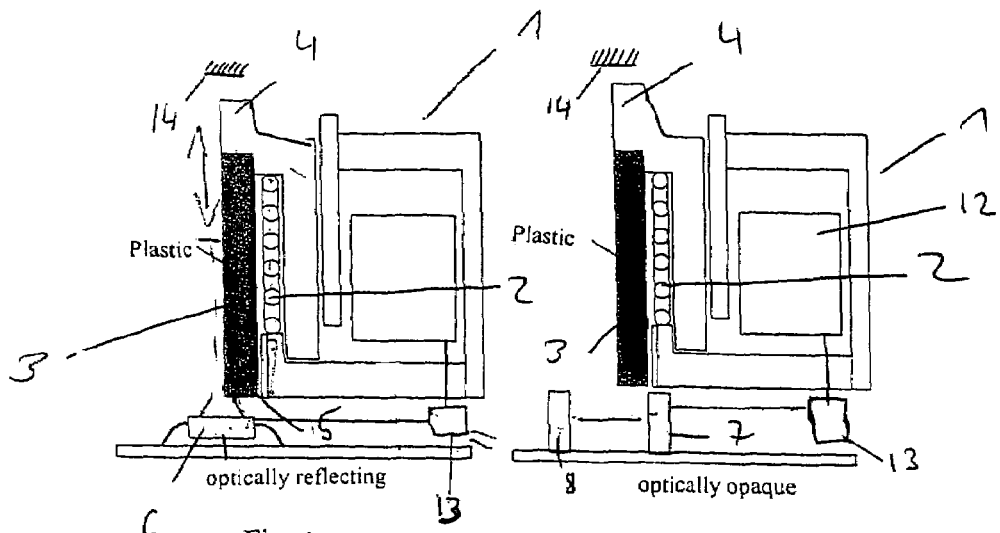
FIG. 1 shows a system according to the present invention having an optical closed-loop position control.
FIG. 2 shows another system according to the present invention having an optical closed-loop position control.

An electromagnetic canister-purge valve 1 including a spring 2, and coil 12 is recognizable in the figures in schematic longitudinal section and in partial view. According to a preferred embodiment of the present invention, a plunger 3 is situated in coil 12, the plunger being fixedly attached to sealing element 4 of the valve. In FIG. 1, plunger 3 has an optically reflecting surface 5 at its end opposite the sealing element. A light beam is guided onto this surface, reflected and detected by an optical sensor 6. Since the reflecting surface moves together with the position change of sealing element 4, the reflected signal changes as a function of this position change and establishes a measure of the gap size between the sealing element 4 and the valve seat 14.

A control unit 13 is connected to optical sensor 6 and coil 12, which together form a closed-loop control circuit. The control unit 13 controls a current through coil 12 according to an electrical signal received from optical sensor 6, which corresponds to a relative position of the plunger 3, and thus the size of the gap between sealing element 4 and valve seat 14.

In the variant illustrated in FIG. 2, plunger 3 is made of an opaque material and immerses into a light barrier formed by light source 7 and sensor 8. The intensity of the light beam hitting sensor 8 is thereby reduced.

Figure 3:
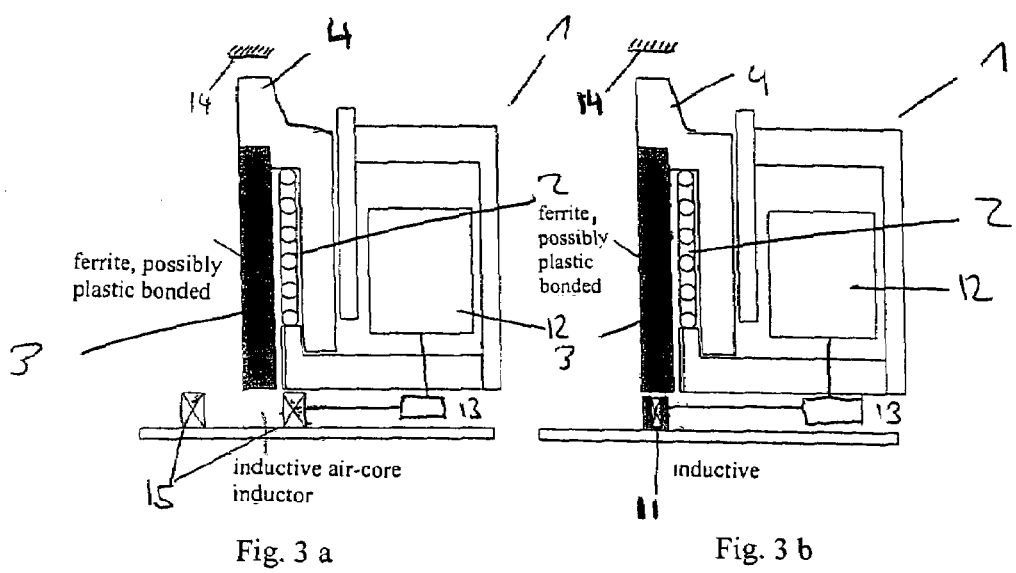
FIG. 3a shows a system according to the present invention having inductive closed-loop position controls.
FIG. 3b shows another system according to the present invention having inductive closed-loop position controls.
Figure 4:
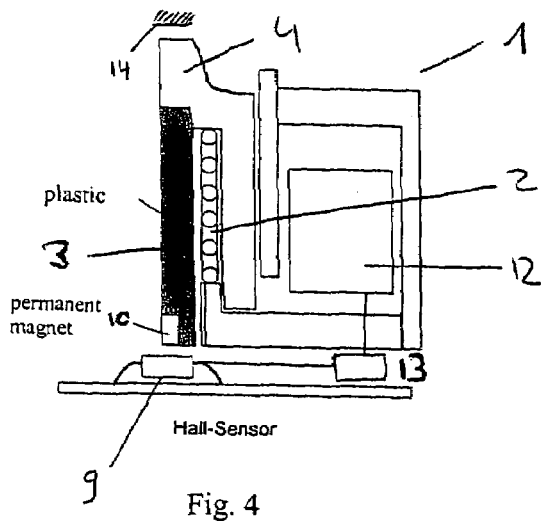
FIG. 4 shows a system according to the present invention having a Hall sensor and a permanent magnet.

FIGS. 3a and 3b show two inductive variants. In FIG. 3a an air core inductor 15 is used to sense field changes caused when a relative position of the plunger changes with respect to a center cavity of the air core inductor 15. In FIG. 3b a magnetoresistive sensor 11 senses a relative distance between the sensor 11 and the plunger 3, which corresponds directly to a size of the gap between the sealing element 4 and the valve seat 14. FIG. 4 shows an embodiment including a Hall sensor 9 and a permanent magnet 10.

What is claimed is:

1. A system for a metered feeding of volatile fuel components, comprising:
    an electromagnetic canister-purge valve having a valve seat, a sealing element and a coil, the canister-purge valve being actuatable in proportional pulse-width modulation;
    at least one detecting device configured to detect a distance between the valve seat and the sealing element; and
    a control unit configured to adjust a coil current through the coil as a function of the distance,
    wherein the at least one detecting device includes a ferromagnetic element and at least one electric conductor loop, wherein a magnetic flux through the at least one conductor loop generated by the ferromagnetic element changes as a function of a position change of the sealing element relative to the valve seat;
    the ferromagnetic element is a plunger attached to the sealing element, the entire plunger being formed of a ferrite; and
    the control unit is connected within a closed-circuit control circuit and the closed-loop control circuit includes a control algorithm configured to dynamically calibrate at least one of a fully open valve position and a fully closed valve position during a service life of the valve.

2. The system as recited in claim 1, further comprising a motor vehicle internal combustion engine having an intake manifold, and wherein the electromagnetic canister purge valve is configured to meter volatile fuel components to the intake manifold.

3. The system as recited in claim 1, wherein the parameter is converted to an electric control signal.

4. The system as recited in claim 1, wherein the ferromagnetic element is disposed so as to move together with the sealing element and the sensor element is disposed on a housing of the valve.

5. An electromagnetic canister purge-valve, comprising:
    a valve seat;
    a sealing element;
    a plunger element attached to the sealing element, said plunger entirely formed of a ferrite such that said plunger element is a ferromagnetic element;
    a coil at least partially adjacent to the plunger;
    at least one detecting device configured to detect a position of the plunger element, the at least one detecting device including at least one electric conductor loop, wherein a magnetic flux through the at least one conductor loop generated by the ferromagnetic element changes as a function of a position change of the sealing element relative to the valve seat, and
    a control unit connected within a closed-circuit control circuit, the closed-loop control circuit including a control algorithm configured to dynamically calibrate at least one of a fully open valve position and a fully closed valve position during a service life of the valve.

6. The electromagnetic canister purge-valve as recited in claim 5, wherein the position of the plunger element corresponds to a distance between the sealing element and the valve seat.

* * * * *